June 20, 1967 W. J. GREENE 3,327,090
DICHROMATIC ELECTRON BEAM DEVICE

Filed May 11, 1964 2 Sheets-Sheet 1

INVENTOR
WILLIAM J. GREENE
BY Edmund W. Bopp
AGENT

June 20, 1967 W. J. GREENE 3,327,090
DICHROMATIC ELECTRON BEAM DEVICE
Filed May 11, 1964 2 Sheets-Sheet 2

INVENTOR
WILLIAM J. GREENE
BY Edmund W. Bopp

AGENT

United States Patent Office 3,327,090
Patented June 20, 1967

3,327,090
DICHROMATIC ELECTRON BEAM DEVICE
William J. Greene, Bound Brook, N.J., assignor to Air Reduction Company, New York, N.Y., a corporation of New York
Filed May 11, 1964, Ser. No. 366,550
6 Claims. (Cl. 219—117)

This invention relates to electron beam apparatus and more particularly to such apparatus for projecting a beam out of a vacuum chamber for welding or like operations in the atmosphere or in the presence of a shielding gas.

An object of the invention is to obviate the necessity of having the workpiece in an evacuated enclosure during the welding operation or the like.

Another object is to project an effective electron beam into an atmosphere of air or of the usual electric arc shielding gases for use in a welding operation or the like.

Another object is to generate in an evacuated enclosure an electron beam suitable for welding and to project the beam through an open orifice into the surrounding atmosphere.

A further object is to reduce leakage of gas through the orifice into the evacuated enclosure while the beam is in use, to such a degree that an effective beam can be generated and projected.

A still further object is to enable the electron beam apparatus to be disconnected from a vacuum pumping system for substantial periods of time for use as a portable welding tool.

In accordance with an illustrative embodiment of the invention, there is provided an evacuable vessel within which is generated a relatively high velocity beam of elemental particles. The term "elemental particles" is to be understood to comprise electrons, positive ions, neutrons, etc. The vessel has a relatively small orifice aligned with the beam and through which the beam can pass. The beam is focused to pass through the orifice and to have a minimum diameter at some point within the orifice or just outside the vessel at a point near the surface of a workpiece. To minimize loss of vacuum at the orifice, there is provided a beam of relatively low velocity electrons projected from within the vessel outwardly into the orifice. This electron beam is made of sufficient diameter to substantially fill the orifice and to have such kinetic energy as to exert within the orifice a kinetic pressure at least as great as the ambient pressure, for example atmospheric pressure, surrounding the vessel. Ambient gas molecules are substantially prevented from entering the vessel through the orifice due to interference with electrons in the low velocity electron beam. At the same time, the high velocity beam, by virtue of its relatively high velocity, is substantially unimpeded either by the low velocity electrons or by gas molecules at ambient pressure over a path length outside the vessel sufficiently long to permit use of the high velocity beam as a welding torch or the like.

A feature of the invention is the combination of a high velocity electron beam for the actual welding operation with a relatively low velocity electron beam for turning back gas molecules tending to enter the orifice into the evacuated enclosure from the atmosphere.

Another feature is the use of a valved separable connection between an evacuated welding tool and a vacuum pumping system.

Because I use two electron beams of different energy values, I call the combined beam a "dichromatic electron beam," referring to the fact that in quantum mechanics, different electron frequencies are attributed to electrons of different energy value, analogous to light rays of different wavelengths.

Other objects, features and advantages will appear from the following more detailed description of illustrative embodiments of the invention, which will now be given in conjunction with the accompanying drawings.

Figure 1:
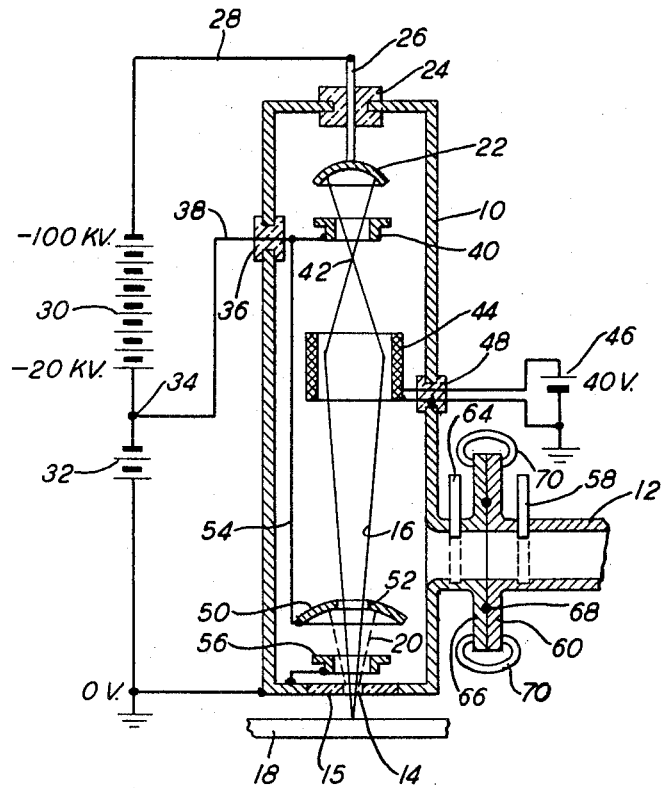
FIG. 1 is a vertical sectional view partly schematic, of a welding tool embodying the invention, the tool being shown connected to a vacuum pumping fixture.

Referring to FIG. 1, there is shown an evacuated welding tool barrel 10 connected to a vacuum pumping system (not shown) by way of a vacuum line fixture 12. At the bottom of the tool 10 is a small orifice 14, preferably in a ceramic insert 15, such as zirconia, through which orifice a high velocity electron beam 16 can emerge from the evacuated interior of the tool 10 and impinge upon a workpiece 18 placed to intercept the beam 16 in an atmosphere of air or shielding gas at a point sufficiently close to the orifice 14 that the beam 16 is coherent and its force is effective to act as a welding beam upon the material of the workpiece.

A second electron beam 20 is arranged to emerge from the evacuated interior of the tool 10 into the orifice 14 for the purpose of turning back molecules of the atmosphere (air or shielding gas) which stream toward the orifice 14 and which would otherwise enter the interior of the tool barrel and destroy the vacuum therein.

The electron beam 20 is composed of relatively low velocity electrons. The velocity of these electrons is within such a range that they collide with gas molecules in the atmosphere and by the force of the collisions tend to drive back molecules that are travelling in the general direction of the orifice. The low velocity electrons are scattered by the collisions, with the result that the low velocity electron beam rapidly loses its form and its coherence, rendering it substantially useless as a welding beam.

The high velocity electron beam 16, on the other hand, comprises electrons of such velocity that they can penetrate the gas molecules, passing through the regions of the electron orbits surrounding the atomic nuclei with very little deflection and rarely colliding with any obstacle such as an atomic nucleus. It is found that there is little scattering of the high velocity beam in the atmosphere until the beam has traversed a substantial distance, over which distance the beam remains coherent. Within this distance there is a gradual decrease in velocity of the electron of the beam until a point is reached beyond which scattering increases rather rapidly so that the beam may quite suddenly lose its coherence and its usefulness for welding. With a sufficient initial velocity in the electron beam, the length of the coherent beam in the atmosphere may be made great enough, say one-quarter to three-quarters of an inch, to provide clearance between the tool barrel and workpiece and to make possible electron beam welding in the atmosphere.

Figure 2:
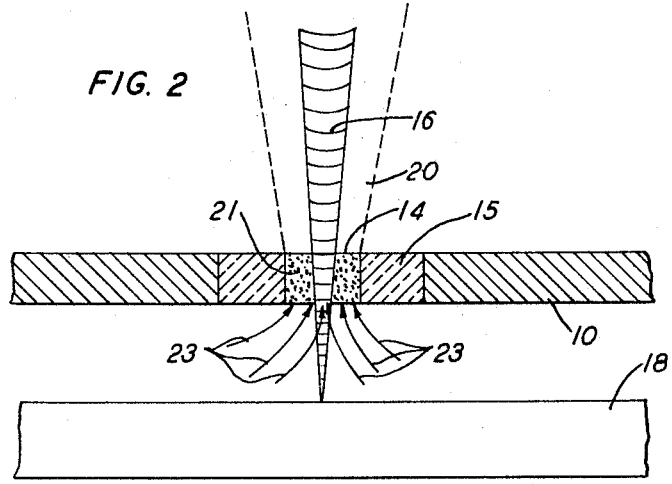
FIG. 2 is an enlarged view of a portion of the device shown in FIG. 1, partly diagrammatical, illustrating the use of two electron beams of different velocity in conjunction with an orifice in an evacuated vessel.

FIG. 2 shows on a larger scale the spatial relationship of the tool barrel 10, orifice 14, workpiece 18, high velocity inner beam 16 and low velocity outer beam 20, the latter beam producing in effect an electron atmospheric plug 21 within the orifice 14, to keep out inrushing air streams shown schematically by arrows 23.

The use of the ceramic insert 15 or the like is advisable due to the intense heat of the electron beams which can cause melting or excessive heating of a metal barrel. The proper size of orifice 14 to fit the beam 20 is preferably assured by starting with a solid insert and using the electron beam to drill the orifice.

The high velocity electron beam 16 may be formed by means of any suitable high voltage electron gun and may be shaped and focused by any suitable means known to the art. FIG. 1 shows an illustrative beaming means schematically represented. A dish-shaped focussing cathode 22 is axially aligned with the orifice 14 and is connected through an insulating bushing 24 by way of a conductive rod 26 and a high voltage conductor 28 to a high voltage direct current source, for example of 100 kilovolts, represented for simplicity in the drawing by serially connected batteries 30 and 32 with a common junction 34. The negative terminal of the source is connected to the cathode 22 and the positive terminal is grounded and connected to the barrel 10 of the tool. The potential at the junction 34 is shown as negative 20 kilovolts and is connected through a bushing 36 by way of a high voltage conductor 38 to an electron accelerating electrode or grid 40, shown as a ring surrounding the central axis of the electron beam. The focussing cathode 22 brings the high velocity beam to a focus at a point 42 below the ring 40. Lens-like means, shown as a focussing magnetic winding 44 is provided in position to refocus the divergent beam at a point below the focal point 42. The winding 44 is energized by a direct current source shown as a battery 46, of for example 40 volts, connected to the winding 44 by means of wires entering the barrel through an insulating bushing 48.

The low velocity electron beam may be formed by means of a dish-shaped cathode 50 having an axially aligned aperture 52 to pass the high velocity beam 16. The cathode 50 is connected to the negative 20 kilovolt terminal 34 over the conductor 38 and a conductor 54, the latter conductor being wholly within the barrel. An electron accelerating grid for the cathode 50 is shown as a ring electrode 56 mounted within the barrel at a position close to the orifice 14. The grid 56 is grounded.

The vacuum line fixture 12 has a vacuum valve shown schematically at 58 and terminates in a flange 60. The barrel of the tool has a side passage 62 containing a vacuum valve 64 and terminating in a flange 66 which mates with the flange 60. The flanges 60 and 66 have matching annular grooves containing a sealing member 68 such as an O-ring. Clamps 70 are shown schematically for clamping the flanges 60 and 66 together and compressing the O-ring 68 to form a vacuum-tight joint between the tool barrel 10 and the vacuum pump system. The pumping system should be capable of maintaining the barrel evacuated to a pressure of about 0.1 micron of mercury ($1.3 \times 10^{-7}$ atmospheres). In this pressure range, diffusion pumps are generally required for attaining the final pressure, with the usual addition of booster pumps and mechanical pumps for roughing and for backing the diffusion pumps. Suitable pumping systems for use with the invention are known and available.

The cathodes 22 and 50 may be indirectly or directly heated by known means to a suitable temperature for electron emission, for example, electrically heated filaments may be employed in thermal contact with or adjacent to the respective cathodes. For the sake of clarity in the drawing, the cathode heating means are not shown.

It can be shown that the kinetic pressure of a beam of electrically charged particles can be expressed by the following formula $$P = \frac{1421}{r_m^2} \sqrt{\left(\frac{m}{e}\right)(EI)(I)}$$

where $r_m$ is the diameter of the beam in centimeters, $m$ is the mass per particle, in grams, $e$ is the electric charge per particle, in coulombs, $EI$ is the power of the beam in watts, and $I$ is the current in the beam in amperes. The formula gives the kinetic pressure $P$ in dynes per square centimeter.

A suitable size for the diameter of the orifice 14 may be determined from consideration of the kinetic pressure of the low velocity electron beam as calculated from the above formula. The pressure of the beam is directly proportional to the force of the beam and indirectly proportional to the cross-sectional area of the beam. The greatest pressure is obtained in a focused beam at a point where the focus is best. The force of the beam can be shown to be directly proportional to the square root of the product of the power in the beam and the current in the beam.

Figure 3:
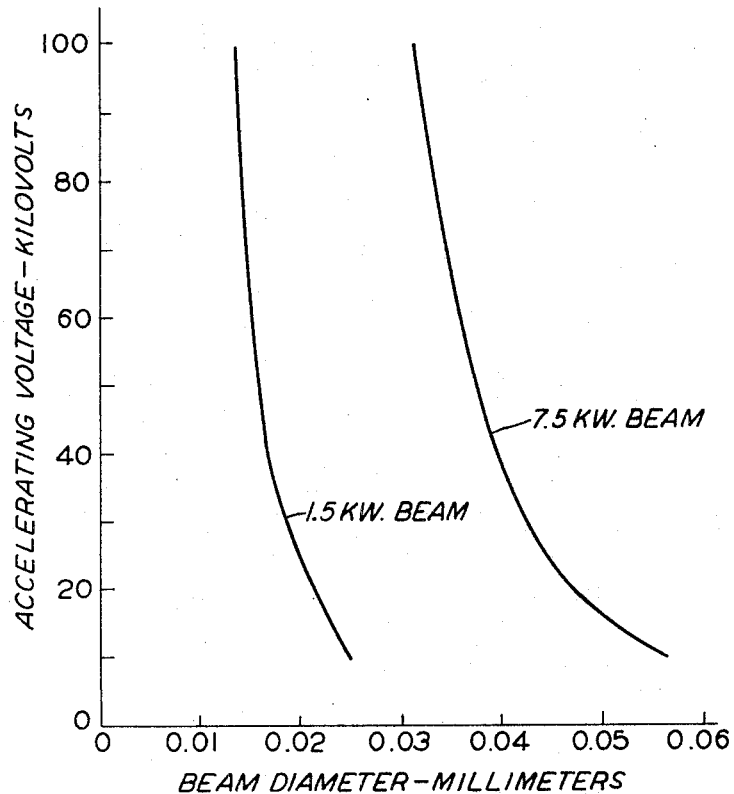
FIG. 3 is a graph showing the beam diameter as a function of accelerating voltage for focused 1500 and 7500 watt electron beams which exerts a kinetic pressure of one atmosphere.

FIG. 3 shows a plot of calculated beam diameter of an electron beam of 1500 watt power as a function of the accelerating voltage, for a beam with a kinetic pressure of one atmosphere.

It is desired that the low velocity electron beam have the property of acting as a plug in the orifice to prevent leakage of gas through the orifice. To do this, the pressure of the beam should be equal to or greater than the pressure outside the orifice, preferably one atmosphere. The higher the accelerating voltage, the smaller beam diameter required to exert a pressure equal to one atmosphere. It is desirable to make the orifice as small as possible in order to further assure reduction of leakage. However, as the voltage of the beam is increased, the beam penetrates the atmosphere gas more easily and in so doing offers less and less obstruction to the leakage of gas through the orifice. For this reason, with a 1500 watt beam, the accelerating voltage preferably should not exceed about 20,000 volts, which according to FIG. 3 corresponds to a beam diameter of about 0.02 millimeter. Therefore, in the example being considered, the orifice 14 should have a diameter of approximately 0.02 millimeter.

The high velocity electron beam should be brought to the best possible focus where it impinges upon the workpiece. The diameter of the focused high velocity beam will generally be readily made smaller than the diameter of the orifice which has been selected to provide the best utilization of the low velocity electron beam for plugging the orifice and reducing leakage of gas into the vacuum chamber through the orifice. Thus, the focused high velocity beam will pass through the orifice and amidst and through the presence of the low velocity electron beam in the orifice.

For use with a low velocity electron beam of 1500 watt power, and 20,000 volt accelerating potential, a high velocity electron beam accelerated by 100,000 volts will require usually from 100 watts to 5000 watts power to project in coherent form a distance of one-quarter inch to three-quarters inch into the atmosphere with sufficient force for the purposes of a welding operation.

The low velocity electron beam is effective to reduce leakage of air into the interior of the tool barrel 10 to such a slow rate that it is feasible to disconnect the tool from the pumping system for reasonable periods of time when it is desired to take the tool to workpieces that cannot readily be brought under the tool, or to parts of a workpiece that are not otherwise accessible to the tool.

Figure 4:
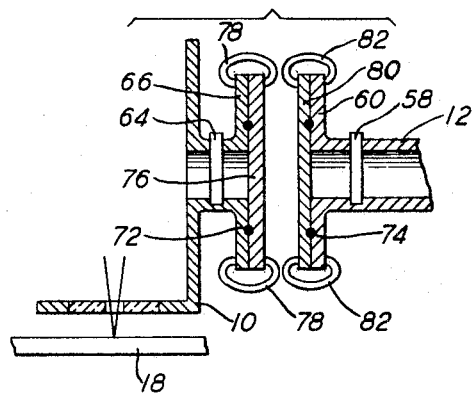
FIG. 4 is a fragmentary view of a portion of the device of FIG. 1, modified to show the welding tool disconnected from the vacuum pumping fixture.

To disconnect the tool from the vacuum fixture 12, the vacuum valves 58 and 64 are first closed, and then the clamps 70 are removed and the seal is broken, allowing the flanges 60 and 66 to be separated and the tool barrel 10 removed. O-rings as at 72 and 74 in FIG. 4 are then put in place and a pair of cover plates 76 and 80 respectively are applied and clamped in place as by clamps 78, 82 to protect the vacuum valves from injury. The cover plates are provided with matching grooves for accommodating the O-rings in conjunction with the grooves in the flanges 60 and 66. FIG. 4 shows the tool barrel 10 and fixture 12 completely separated. After a certain period of use of the tool apart from the vacuum pumping system, the vacuum in the tool barrel becomes impaired to a point at which the high velocity beam is ineffective for welding, at which time the tool may be reconnected to the pumping system and re-evacuated. In apparatus of the type illustrated herein, working periods of ten minutes or more with the tool disconnected from the pumping system are entirely feasible.

While the use of a relatively low velocity electron beam, as a means of plugging an orifice in a wall between regions of widely different pressure to reduce leakage of gas through the orifice, has been illustrated herein in conjunction with a relatively high velocity electron beam arranged to pass through the orifice from the low pressure side to the high pressure side without material loss of force, it will be evident that the beam that thus penetrates the low velocity electron beam in the orifice may be any other suitable highly penetrating beam, for example a beam of positively charged ions. However, the specific kind of elemental particle comprised in the penetrating beam is not a part of the invention in its broadest aspects, nor is the specific means for, or method of generating or focusing the penetrating beam a part of the invention in any aspect.

It will be evident that cooling of the inner surface of the wall of the tool barrel by means of a cryogenic coolant, such as liquid helium, may be used if desired to supplement the plugging action of the low velocity electron beam by condensing molecules that succeed in entering the evacuated chamber and thus reducing loss of vacuum. In this case, provision must be made for periodic thawing and removal of accumulated condensed material, but with the plugging action of the beam, such removal period can be greatly lengthened so as to extend over several intervals of use of the tool disconnected from the pumps.

It will be noted that by putting more power into the low velocity electron beam, as by increasing the current in the beam for a given accelerating voltage, the kinetic pressure of the beam for a given beam diameter will be increased, so that a larger diameter orifice can be plugged at a given pressure. For example, a beam of 7500 watt power with 20 kilovolt accelerating voltage may be used to form an effective one atmosphere plug in an orifice of about 0.045 millimeter diameter.

While illustrative forms of apparatus and methods in accordance with the invention have been described and shown herein, it will be understood that numerous changes may be made without departing from the general principles and scope of the invention.

What is claimed is:

1. In electron beam apparatus, in combination, an evacuated vessel, means for generating within said vessel a relatively high velocity beam of elemental particles, said vessel having a relatively small orifice aligned with said high velocity beam through which orifice the said beam can pass, and means for generating and directing a beam of relatively low velocity electrons projected from within said vessel outwardly into said orifice, said electron beam being of sufficient diameter to substantially fill said orifice and having such kinetic energy as to exert within said orifice a kinetic pressure at least as great as the ambient pressure surrounding said vessel, whereby ambient gas molecules are substantially prevented from entering said vessel through said orifice due to interference with electrons in said electron beam in said orifice, and whereby said high velocity beam by virtue of its relatively high velocity is substantially unimpeded either by said electrons or by gas molecules at ambient pressure over a path of useful length outside said vessel.

2. In a welding torch or the like, in combination, an evacuated vessel, means for generating and focusing within said vessel a first, relatively high velocity electron beam, said vessel having a relatively small orifice aligned with said high velocity beam through which orifice the said beam can pass, means for generating within said vessel a second, relatively low velocity electron beam, and means for directing said low velocity beam into said orifice, said low velocity beam being substantially the same diameter as said orifice and having such kinetic energy as to exert within said orifice a kinetic pressure at least as great as the ambient relatively high pressure in a region surrounding said vessel, whereby ambient gas is substantially prevented from entering said vessel through said orifice due to said kinetic pressure of said low velocity beam acting outwardly from said vessel, or the like, said high velocity beam having such high velocity as to pass substantially unimpeded through said beam of relatively low velocity electrons and through the said region of relatively high pressure outside said vessel over a path length sufficiently long to permit use of said high velocity beam for welding or the like.

3. Apparatus according to claim 1, in which the said relatively high velocity beam is an electron beam accelerated by an accelerating voltage of approximately 100 kilovolts, the said beam of relatively low velocity electrons is approximately a 1.5 kilowatt beam accelerated by an accelerating voltage of approximately 20 kilovolts, and the said orifice is approximately 0.02 millimeter diameter.

4. Apparatus according to claim 3, in which the power of the said relatively high velocity electron beam is substantially within the range from 100 watts to 5 kilowatts.

5. Apparatus according to claim 1, in which the said relatively high velocity beam is an electron beam accelerated by an accelerating voltage of approximately 100 kilovolts, the said beam of relatively low velocity electrons is approximately a 7.5 kilowatt beam accelerated by an accelerating voltage of approximately 20 kilovolts, and the said orifice is approximately 0.045 millimeter diameter.

6. Apparatus according to claim 1, in which there is included a separable vacuum-tight connection between the interior of the said evacuated vessel and a vacuum line fixture, a first vacuum valve in said separable connection on the side toward the said evacuated vessel, and a second vacuum valve in said vacuum line fixture, whereby said evacuated vessel may be connected to the vacuum line fixture for evacuating the same or may be disconnected from the vacuum line fixture for use apart therefrom.

References Cited

UNITED STATES PATENTS

| 3,217,135 | 11/1965 | Eklund. |
| 3,219,792 | 11/1965 | Pederson. |
| 3,271,556 | 9/1966 | Harris. |

FOREIGN PATENTS

| 1,033,816 | 7/1958 | Germany. |

RICHARD M. WOOD, *Primary Examiner.*

B. A. STEIN, *Assistant Examiner.*